Feb. 27, 1968   J. J. WILENTCHIK   3,370,736
THERMOSETTING PLASTIC CASES AND NON-MOLDING
METHOD OF MAKING SAME
Filed Dec. 19, 1963
FIG. 1
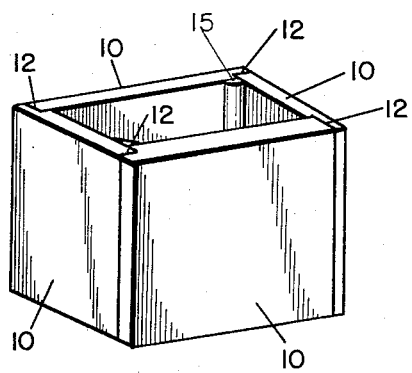
FIG. 1A
FIG. 2
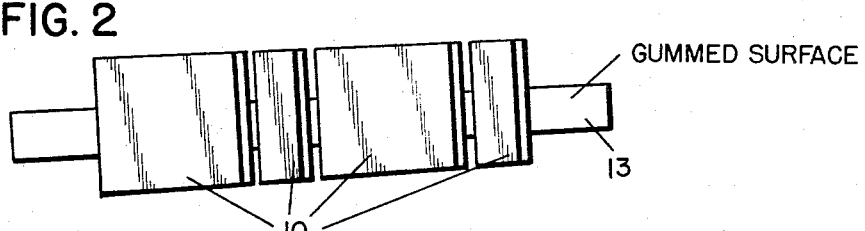
GUMMED SURFACE
FIG. 3
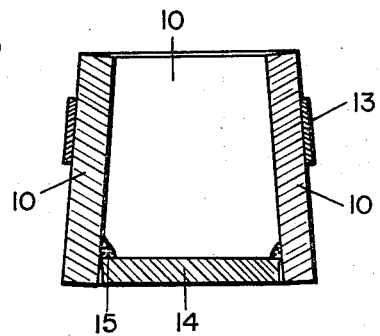
FIG. 5
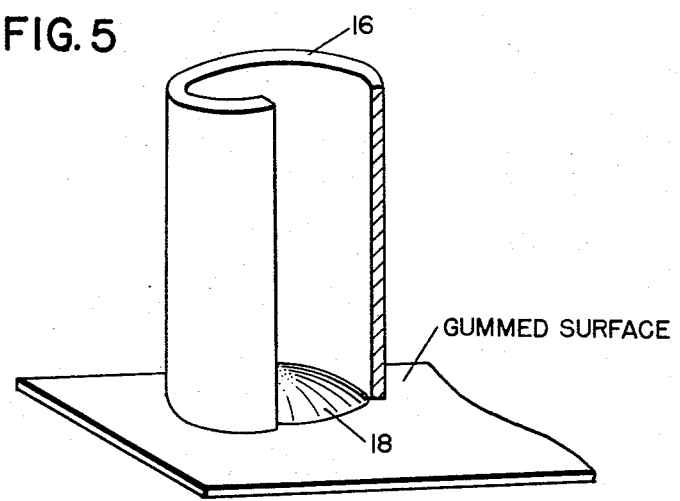
GUMMED SURFACE
FIG. 4
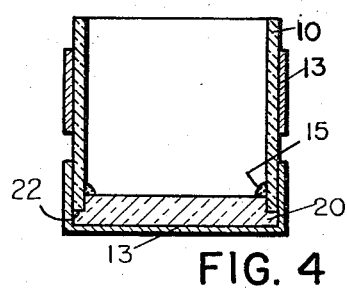
INVENTOR.
JERZY J. WILENTCHIK
BY *Herbert L. Lerner*
ATTORNEY

United States Patent Office 3,370,736
Patented Feb. 27, 1968

3,370,736
THERMOSETTING PLASTIC CASES AND NON-MOLDING METHOD OF MAKING SAME
Jerzy J. Wilentchik, 44 Prospect St., Yonkers, N.Y. 10701
Filed Dec. 19, 1963, Ser. No. 331,816
13 Claims. (Cl. 220—4)

My invention relates to a method of making cases, particularly for packaging electrical components, from thermosetting plastics, such as epoxy and phenolic resins, without molds.

Mass production of cases made of phenolic and epoxy resins by casting or molding methods is known. Such methods of production, however, necessitate the prior machining of dies and molds at great expense and requiring highly skilled technicians. The expenses are prohibitive, however, where only a limited quantity of cases of a specific size and shape are required.

It is accordingly an object of my invention to provide a method of making cases of thermosetting plastics, such as epoxy and phenolic resins, without requiring the prior manufacture of dies and molds and to thereby make available at relatively low initial cost cases that are needed only in small quantities.

Features which are considered as characteristic for the invention are set forth in the appended claims. The construction and method of the invention, however, together with additional objects and advantages thereof will be best understood from the following description when read in connection with the accompanying drawings. Although the invention has been illustrated and described as a method of making cases of thermosetting plastics such as phenolic and epoxy resins, without molds, it is nevertheless not intended to be limited to the details shown since various modifications and structural changes may be made therein without departing from the spirit of the invention and within the scope and range of equivalents of the claims.

In the figures:

FIG. 1 is a perspective view of a case constructed in accordance with the method of my invention;

FIG. 1A is a horizontal view of a modification of the case shown in FIG. 1;

FIG. 2 is a plan view of the wall components of the case shown in FIG. 1 laid out on an adhesive tape prior to assembly;

FIG. 3 is a vertical sectional view of the case shown in FIG. 1; and

FIG. 4 is a vertical, sectional view of a modification of the case shown in FIG. 1;

FIG. 5 is a perspective view, partly in section, of a cylindrical case constructed in accordance with my invention.

Referring now to the drawings and particularly to FIG. 1, there is shown a case having rectangular cross-section. Each of the walls 10 of the case is of uniform thickness except for a notch 12 at one end thereof which is of such width as to accommodate the thickness of an adjacent wall as shown in FIG. 1. The walls of the case are strips or plates of thermosetting plastic such as epoxy or phenolic resin, that have been cut from standard size sheets purchased in the trade and which meet the particular specifications of the case. The notches 12 can be sawed by hand or machine or can be formed by a shaper, routing device or similar tool. The corners of the case i.e. the side edges of the walls, are coated with epoxy cement which, upon hardening, produces a unitary walled structure. Of course, such cases can also be made with three walls or more than four walls by suitably cutting notches of angular cross-section other than the right angle shown in FIG. 1, so that there is as close a fit between adjacent wall edges as is reasonably possible.

Referring to FIG. 1A there is shown a horizontal view of a case similar to case seen in FIG. 1, except that two of opposite walls 10 have no notches at all.

In FIG. 2 there is shown a strip 13 of cloth, paper and the like having an adhesive surface, such as ordinary masking tape, on which the walls shown in FIG. 1 are disposed successively in engagement with or slightly spaced from each other in a common plane so that when the two ends of the adhesive strip are put together the walls will assume the position shown in FIG. 1, thereby forming a sleeve structure. After the walls are put together and maintained in their finally oriented position of FIG. 1 by the forces exerted by the tightening of the adhesive strip as it is pulled together to press the adjacent edges of the walls against one another so that the edge of one wall is received in the notch 12 of the adjacent wall, a base member 14 that is slightly wider than the inner dimensions of the thus formed sleeve structure held together by the adhesive strip and that also consists of a strip or plate of thermosetting plastic such as epoxy or phenolic resin, is forced into the position shown in FIG. 3 against the lower edge portion of the walls 10 in opposition to the forces exerted by the adhesive strip. The lower edge portion of the walls 10 yield outwardly slightly to accommodate the slightly wider base 14 which is held by friction against the lower edge portion of the side walls of the case as shown in FIG. 3. It may be also possible for the base 14 not to be wider but equal to or slightly smaller than the inner dimensions of the sleeve structure into which it is to be inserted. If such are design requirements, the base may be held in proper position in relation to the sleeve structure by one or more strips of adhesive extending from one of the walls, across the base and to the opposite wall of the case, as shown in FIG. 4. The adjacent corner edges of the walls 10 forming the sleeve structure and the edges of the base plate 14 or the inner sides of the lower wall portions or both are then coated with epoxy cement 15 which penetrates into any spaces that may exist between the edges due to irregularities in sawing or the like and due to the outward yielding caused by insertion of the base 14. The epoxy cement need not be applied after the base plate 14 is inserted between the side walls 10 but may be applied along the edges before the base is previously inserted, and thereafter permitted to harden. The adhesive tape is removed after the walls and the base are cemented together. The base 14 serves generally the additional purpose of squaring out corners of a rectangular case and maintaining them in this position until the cement is applied and hardened.

In FIG. 4 there is shown a method of making a case of rectangular or generally polygonal cross section substantially similar to one shown in FIGS. 2 and 3 except that the base member 20 corresponding to the base member 14 has routed or milled notches 22 to receive bottom end edges of respective walls 10. The base 20 is retained in place by a strip of adhesive 13.

In FIG. 5 there is shown a case having an integral cylindrical wall 16. In this embodiment, the base 18, corresponding to the base 14 of the embodiment of FIG. 3, can have a diameter just large enough as to be received in the hollow cylindrical sleeve in frictional engagement with the inner surface of the sleeve at the lower end portion thereof. The base 18 is then cemented with epoxy to the lower end portion of the cylindrical sleeve structure 16 much like the base 14 is cemented to the side walls of the case shown in FIG. 3. The cylindrical wall or sleeve structure 16 can be previously formed by any known means such as by an extrusion process.

The base of the cylindrical case can be formed in a somewhat different manner in keeping with my invention. The cylindrical wall 18 can be positioned on a surface consisting of gummed masking tape as shown in FIG. 5 and liquid epoxy or phenolic resin i.e. in molten or flowing form, can be poured through the open top thereof to a desired amount so that it forms a base wall of suitable thickness that is firmly joined to the lower end portion of the cylinder after hardening. A similar pouring process can be utilized for cases that do not have a cylindrical wall but rather triangular, rectangular and other polygonal cross sections, as well as elliptical, semicircular and even free-form cross sections.

It has been found that cases having walls and bases of as little as .010 or .015 inch thickness can be made by the aforedescribed method as well, of course, of cases having walls and bases of considerably greater thickness.

I claim:

1. A method of making cases from thermosetting plastic materials which comprises the steps of forming a sleeve structure of the thermosetting plastic material by cutting two pairs of wall members from a sheet of said material, notching one edge of each of said members to a depth substantially equal to the thickness of said wall members, and cementing said wall members to each other so that an unnotched edge of one wall member is received in the notch of the adjacent member, and of providing a base of a thermosetting plastic material at one end of said sleeve structure by applying the thermosetting plastic material in hardenable liquid state at said end and permitting the hardenable liquid material to harden.

2. A method of making cases from thermosetting plastic materials which comprises the steps of cutting more than two wall members from a sheet of thermosetting plastic material, laying said wall members in alignment alongside each other on the adhesive strip so that they are held against movement with respect to each other in the plane of the strip, bringing the ends of said strip together and tensioning said strip so as to form a sleeve structure held together by said adhesive strip, and cementing said wall members to each other to form an integral sleeve, and forming a base of thermosetting plastic material at one end of said sleeve by applying the material in hardenable liquid state at said end and permitting the hardenable liquid material to harden.

3. A method of making cases from thermosetting plastic materials which comprises the steps of forming a sleeve structure, forcing a resilient plate of thermosetting plastic material having a dimension greater than the inner dimension of said sleeve into one end of said sleeve structure so as to expand the cross sectional area of said sleeve structure at said one end, and applying thermosetting plastic material in liquid hardenable state between the edges of said base plate and the end wall portions of said sleeve structure and allowing the hardenable liquid material to harden.

4. A method of making cases from thermosetting plastic materials which comprises the steps of forming a sleeve structure of thermosetting plastic material by cutting two pairs of wall members from a sheet of said material, notching two edges in one pair of said members to a depth substantially equal to the thickness of said wall members, assembling said wall members together so that the unnotched edges of two of said wall members are received in respective notches of adjacent notched members, inserting a plate of thermosetting material at one end of said sleeve structure to provide a base therefor, and applying plastic cement between said wall members and said base plate.

5. A method of making cases from thermosetting plastic materials which comprises the steps of forming a sleeve structure of thermosetting plastic material by cutting two pairs of wall members from a sheet of said material, notching one edge of each of said members to a depth substantially equal to the thickness of said wall members, assembling said wall members together so that the unnotched edges of said wall members are received in respective notches of adjacent members, inserting a plate of thermosetting material at one end of said sleeve structure to provide a base therefor, and applying plastic cement for holding said wall members and said base plate together.

6. A method of making cases from thermosetting plastic materials which comprises the steps of forming a sleeve structure of thermosetting plastic material by cutting two pairs of wall members to a depth substantially equal to the thickness of said wall members, assembling said wall members together so that the unnotched edges of two said wall members are received in respective notches of adjacent notches members, cutting a plate of thermosetting plastic material having dimensions approximately equal to the inner dimensions of said sleeve structure, inserting said plate at one end of said sleeve structure to provide a base therefor, and applying plastic cement to adjacent corner edges of respective wall members forming said sleeve structure and to the seams between said wall and said base plate.

7. A method of making cases from thermosetting plastic material which comprises the steps of forming a sleeve structure of thermosetting plastic material by cutting two pairs of wall members from a sheet of said material, notching the edges of at least two of said members to a depth substantially equal to the thickness of said wall members, assembling said wall members together so that the unnotched edges of said wall members are received in respective notches of adjacent notched members, inserting a plate of thermosetting plastic material at one end of said sleeve structure to provide a base therefor, and cementing said wall members and said base plate together.

8. A method of making cases from thermosetting plastic materials which comprises the steps of cutting more than two wall members from a sheet of thermosetting plastic material, laying said wall members in alignment alongside each other on the adhesive surface of an adhesive strip so that they are held against movement with respect to each other in the plane of the strip, bringing the ends of said strip together and tensioning said strip so as to form a sleeve structure held together by said adhesive strip, inserting a plate of thermosetting material a one end of said sleeve structure to provide a base therefor, and cementing said wall members and said base plate together.

9. A method of making cases from thermosetting plastic materials which comprises the steps of forming a sleeve structure of the thermosetting plastic material by cutting a plurality of wall members from a sheet of said material, notching selected edges of said members to a depth substantially equal to the thickness of said members, cementing said members to one another at their edges so that an unnotched edge of one member is received in a notch of an adjacent member, and providing a base of a thermosetting plastic material at one end of said sleeve structure by applying the thermosetting plastic material in hardenable liquid state at said end and permitting the hardenable liquid material to harden.

10. A case of plastic material comprising a plurality of substantially rectangular sheets of thermosetting plastic material, said sheets being joined at edges thereof so as to define a sleeve structure of predetermined cross-sectional area, an unnotched edge of one of said sheets being received in the notch of an edge of another of said sheets at each of said joined edges of said sheets, and another sheet of thermosetting plastic having an area slightly larger than said predetermined area and being wedged in one end of said sleeve structure in frictional engagement with said pairs of sheets, said other sheet being secured with cement edgewise to said plurality of sheets and said plurality of sheets being secured with epoxy cement edge to edge one to each other.

11. A case of plastic material comprising two pairs of rectangular planar sheets of thermosetting plastic material, respectively spaced opposite each other so as to form a sleeve structure of predetermined rectangular inner cross-sectional area, each of said sheets having a notch extending along a lateral edge thereof, said notch having a depth substantially equal to the thickness of said sheets whereby the lateral edge opposite the notched edge of each sheet can be received in the notch extending along the lateral edge of an adjacent sheet, and another rectangular sheet of thermosetting plastic material having an area slightly larger than said predetermined area and being wedged in one end of said sleeve structure in frictional engagement with said pairs of sheets, said other rectangular sheet being secured with exopy cement edgewise to said pairs of sheets and said pairs of sheets being secured with epoxy cement edge to edge one to each other.

12. A case of plastic material comprising two pairs of rectangular planar sheets of thermosetting plastic material, respectively spaced opposite each other so as to form a sleeve structure of predetermined rectangular inner cross-sectional area, the sheets of one of said pairs having a notch extending respectively along opposite lateral edges thereof, said notches having a depth substantially equal to the thickness of said sheets whereby the lateral edges of the other of said pairs can be received respectively in one of the notches of each of the sheets of said one pair, and another rectangular sheet of thermosetting plastic material having an area slightly larger than said predetermined area and being wedged in one end of said sleeve structure in frictional engagement with said pairs of sheets, said other rectangular sheet being secured with epoxy cement edgewise to said pairs of sheets and said pairs of sheets being secured with epoxy cement edge to edge one to each other.

13. A case of plastic material comprising two pairs of rectangular planar sheets of plastic material, respectively spaced opposite one another so as to form a sleeve structure of predetermined rectangular inner cross-sectional area, and another rectangular sheet of plastic material having an area slightly larger than said predetermined area and being wedged in one end of said sleeve structure in frictional engagement with said pairs of sheets, said other rectangular sheet being secured with epoxy cement edgewise to said two pairs of sheets and said two pairs of sheets being secured with epoxy cement edge to edge one with another wherein the thickness of said sheets is substantially between .010 and .015 inch and at least the sheets of one of said pairs of sheets have a notch extending along a lateral edge thereof, said notch having a depth substantially equal to the thickness of said sheets whereby a lateral edge of the sheets of the other pair of sheets can be received respectively in the notch extending along the lateral edge of the sheets of said one pair of sheets.

References Cited

UNITED STATES PATENTS

| | | | |
|---|---|---|---|
| 2,663,908 | 12/1953 | Maier et al. | 264—268 |
| 2,684,774 | 7/1954 | Aichele | 264—268 X |
| 2,787,397 | 4/1957 | Radford | 220—5 |
| 3,075,870 | 1/1963 | Hedler et al. | 156—295 |
| 3,162,705 | 12/1964 | Smucker et al. | 264—53 |
| 3,203,611 | 8/1965 | Anderson et al. | 229—1.5 |
| 2,324,745 | 7/1943 | Weber | 156—215 X |
| 2,584,095 | 1/1952 | Slaughter | 156—305 X |
| 2,800,945 | 7/1957 | Schilling | 156—292 X |
| 2,881,939 | 4/1959 | Nelson | 217—5 |

EARL M. BERGERT, *Primary Examiner.*

HAROLD ANSHER, *Examiner.*